United States Patent [19]

Somers et al.

[11] Patent Number: 4,983,080

[45] Date of Patent: Jan. 8, 1991

[54] PUSH-BUTTON CONTROLLED APPARATUS FOR RELEASABLY STORING A TOOL BIT

[75] Inventors: Robert I. Somers, Reisterstown, Md.; William G. Harman, Jr., Glenrock; Frank O'Hara, Hanover, both of Pa.; William R. Stumpf, Kingsville, Md.

[73] Assignee: Black & Decker, Inc., Newark, Del.

[21] Appl. No.: 409,489

[22] Filed: Sep. 19, 1989

Related U.S. Application Data

[63] Continuation-in-part of Ser. No. 81,867, Aug. 5, 1987, abandoned.

[51] Int. Cl.[5] ............................................ B23B 45/00

[52] U.S. Cl. .................................. 408/241 R; 81/490

[58] Field of Search ........... 408/239 R, 239 A, 241 R; 279/1 A, 1 B, 1 TS, 76, 79, 80, 85, 86, 87, 97; 81/489, 490, 491

[56] References Cited

U.S. PATENT DOCUMENTS

| | | | |
|---|---|---|---|
| 647,396 | 11/1927 | Decker | 279/1 K |
| 722,899 | 3/1903 | Reeder | 81/490 X |
| 873,625 | 10/1907 | Starrett . | |
| 1,222,320 | 4/1917 | Pauli | 279/80 X |
| 1,938,860 | 12/1933 | Rener | 279/79 |
| 2,158,728 | 5/1939 | Peters | 279/109 |
| 3,348,432 | 10/1967 | Kiefer, III | 279/1 K |
| 4,409,866 | 10/1983 | McBride | 81/491 |
| 4,491,443 | 1/1985 | De Caro | 408/239 A |
| 4,588,335 | 5/1986 | Pearson, Jr. | 408/239 R |

*Primary Examiner*—Z. R. Bilinsky

*Attorney, Agent, or Firm*—Dennis A. Dearing; Charles E. Yocum; John D. Del Ponti

[57] ABSTRACT

A tool bit such as a screw driving bit for use with a rotary power tool is conventiently stored in a cavity in the rotary power tool housing when not in use in a power tool chuck. The tool bit is retained in the recess by frictional engagement with a retainer spring. A push-button protruding from the rotary tool housing communicates with the bit holding cavity and retainer spring in a manner such that, upon depression of the push-button, the retainer spring is moved out of frictional engagement with the bit to enable its release from the storage cavity.

21 Claims, 5 Drawing Sheets

PUSH-BUTTON CONTROLLED APPARATUS FOR RELEASABLY STORING A TOOL BIT

This is a continuation-in-part of application Ser. No. 081,867 entitled "PUSH-BUTTON CONTROLLED APPARATUS FOR RELEASABLY STROING A TOOL BIT" filed on Aug. 5, 1987, now abandoned.

BACKGROUND OF THE INVENTION

The invention pertains generally to storage of spare or idle tool bits in the housing of a tool. More specifically, the invention concerns idle tool bit retention by a spring with tool bit release effected by deflecting the spring out of engagement with the tool bit.

Known arrangements for retaining spare or idle tool bits, such as drill bits or screw driving bits for portable rotary power tools, typically require a portion of the stored tool bit to protrude from the tool housing for grasping by the operator to pull the bit from its storage compartment. Other known arrangements require the movement by hand of a sliding or hinged or screw threaded cap which covers the storage compartment.

Representative known patents related to the idle tool bit retention art are U.S. Pat. No. 3,348,432-Kieffer; U.S. Pat. No. 2,158,728-Peters; U.S. Pat. No. 1,647,396-Decker; U.S. Pat. No. 873,625-Starrett; and U.S. Pat. No. 722,899-Reeder.

U.S. Pat. No. 722,899-Reeder provides a handle with a tool holding chamber at the end thereof. A spring actuated slidable closure member is moved out of line with the chamber to permit egress of a tool or nail set housed in the chamber. The sliding closure is spring loaded to return the closure to its closed position.

U.S. Pat. No. 873,625-Starrett discloses a screw driver with a hollow two-part handle for holding a plurality of blades having a common butt-end size. The non-used blades are frictionally held from rattling within the handle and from dropping out when a storage cavity cap is removed. A steel sheet spring is used to press the enclosed blades against the opposite inner wall of the body for such storage.

U.S. Pat. No. 1,647,396-Decker discloses a rotary tool with a pocket for retaining the chuck key. The key is held in its pocket by a spring or similar type grip and a portion of the key protrudes from the rotary tool body. The operator must pull on the key directly to release it.

U.S. Pat. No. 2,158,728-Peters discloses a leaf spring for holding a tool blade in its main cavity of the tool handle. The spring is placed longitudinally of the tool bit cavity to urge the tool into frictional engagement therein. To release the tool, the operator must grasp the tool shank end and exert a slow, straight pull outwardly of the tool handle body.

U.S. Pat. No. 3,348,432-Kieffer is related to '396-Decker in that it teaches a chuck key retaining structure. A slot in the drill body slidably receives a handle stem of the chuck key and retains the handle in the slot by means of resilient material such as rubber which partially extends into the slot for frictional engagement with the chuck key handle.

There is a need for an idle tool bit storage arrangement, particularly suitable for portable power tools, wherein the tool body housing envelope is compromised by a minimal external opening with provision for relatively easy release of the tool bit from its storage compartment.

SUMMARY OF THE INVENTION

Accordingly, one embodiment of the invention contemplates apparatus for storing a tool bit in a housing having a first housing cavity opening at a peripheral surface thereof and shaped for sliding receipt of all of the tool bit to be retained. A second cavity in the housing communicates with the first cavity and opens at a peripheral surface of the housing. The second cavity extends substantially transversely of the first cavity. Retention means are located in the first cavity for resiliently urging the tool bit into frictional engagement with a wall of the first cavity. An actuator is slidably received in the second cavity, has a head portion lying in the peripheral surface opening of the second cavity and has a bearing portion coupled to the head portion. The bearing portion abuts the retention means in a manner such that upon pressure being exerted upon the head portion, the bearing portion will deflect the retention means away from the tool bit thereby enabling the bit's release from the first cavity.

A second embodiment of the invention contemplates an apparatus for storing a tool bit in a housing having a first housing cavity opening at a peripheral surface thereof and shaped for sliding receipt of all of the tool bit to be retained. Retention means in the cavity is moveable between an engaged position for retaining the tool bit in the cavity and a disengaged position for releasing the tool bit for movement in the cavity. Holding means in the cavity is engaged with the tool bit and is moveable between the first position in which the tool bit is enclosed in the cavity and a second position in which the tool bit is partially exposed from the cavity. Actuating means is slidably moveably in the housing for moving the retention means between the engaged and the disengaged position thereby enabling the holding means to move the first position to the second position.

BRIEF DESCRIPTION OF THE DRAWING

An understanding of the invention will become apparent from a reading of a description of two embodiments, taken in conjunction with drawing, in which:

FIG. 8_c_ is a cross-sectional view of FIG. 8_a_ taken along line 8_c_—8_c_;

DETAILED DESCRIPTION

Figure 1:
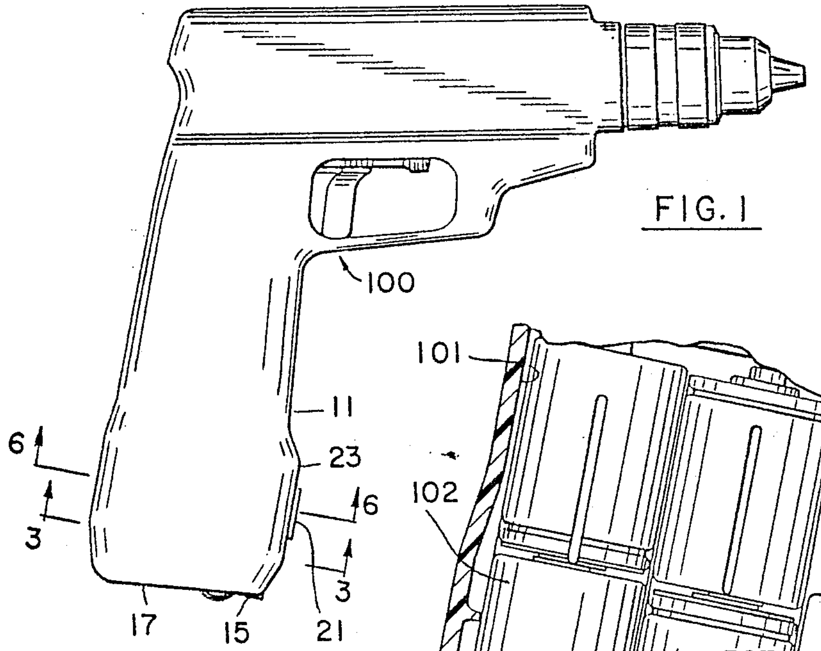
FIG. 1 is a plan view of a portable cordless power drill in which the invention is applicable.

Reference will now be made to two embodiments of the invention. The first embodiment of the invention is illustrated in FIGS. 2–5. The second and preferred embodiment is illustrated in FIGS. 6–9. Common components used in both embodiments are numbered identically in the drawings.

In FIG. 1, the general type of portable rotary power tool typically utilizing the storage arrangement of the invention is set forth. Handle 11 of drill 100 includes a storage cavity (not specifically shown in this figure) for retaining a spare or idle tool bit. The storage cavity opens at the bottom surface 17 of handle 11 at 15. A push-button whose head is shown at 21 protrudes slightly from a housing cavity for the push-button which extends substantially transversely to the storage cavity.

A screw driving bit is a popular choice of a specialty item for a power drill not normally associated with standard accessory kits; such as drill bit kits. Therefor, in a preferred form the tool bit to be stored in the handle cavity is a screw driving bit.

With reference to FIGS. 2 through 5_b_, illustrating the first embodiment the details of the storage cavity arrangement and the means for retaining and releasing a bit therein are set forth. An open-ended recess or cavity 13 extends longitudinally of drill handle 11 from an opening 15 in a bottom surface 17 of the handle housing. A second cavity in the handle housing designated 24 is shaped for sliding receipt of a push-button element 21. The cavity 24 is stepped as shown at 13_c_ for receipt of a flange portion 303 of the push-button element. Cavity 24 extends substantially transversely to cavity 13 and communicates therewith.

Figure 2:
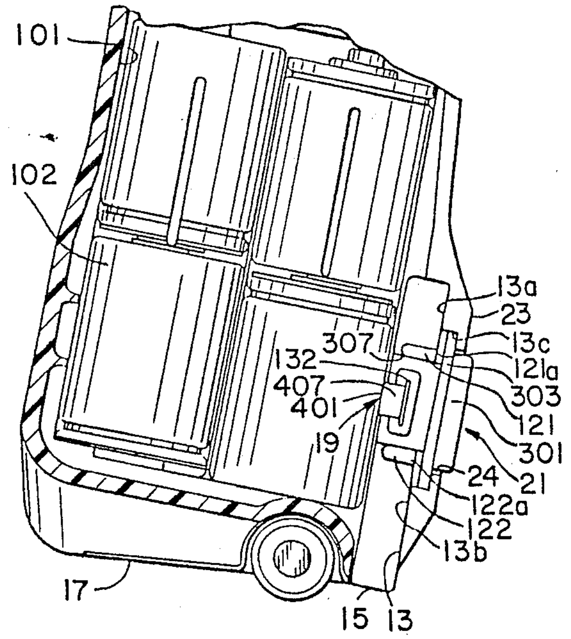
FIG. 2 is a partial side plan view with cross-sectioning of a portion of the handle of the power drill of FIG. 1 showing the apparatus for storing a tool bit in accordance with a first embodiment of the invention.

As seen from FIGS. 4_a_ through 4_c_, push-button element 21 includes a head portion 301 surrounded by a flange portion 303 having flange bearing walls 311_a_ and 311_b_ which bear against recess wall 13_c_ of FIG.2. Extending from the flange portion 303 are two legs or wing elements 305 and 307 which along with flange portion 303 define three-sided cavity 309.

Returning to FIGS. 2 and 3, the retention means includes a substantially planar leaf spring 19 facing the second transverse housing cavity and having its ends retained in housing walls of cavity 13 at indentations or notches 131 and 132. The cavity 309 defined by the leg elements 305 and 307 and the flange portion 303 of push-button element 21 and the surface 401 of the leaf spring 19 define a cavity 411 which permits the shank of the tool bit to be stored to slide therethrough. As seen from FIGS. 5_a_ and 5_b_, the retainer spring comprises a bent leaf spring having a bit bearing wall portion 401 connected by substantially normal sections 407 and 409 to respective end portions 403 and 405. The ends of the sections 403 and 405 remote from the central bearing portion 401 are inserted into the retaining notches 131 and 132 in the handle housing.

As seen from FIG.2, the leg or wing elements 305 and 307 of push-button element 20 are guided in their sliding motion through the transverse cavity 24 by a plurality of protrusions, two of which are shown at 121 and 122. The locators 121 and 12 protrude from the drill handle housing into cavity 13 and guide wing members 305 and 307 in a substantially normal direction to section 401 of leaf spring 19. Additionally, ends 121_a_ and 122_a_ of protrusions 121 and 122 provide stop surfaces for limiting the inward sliding motion of push-button element 21 by coming into contact with flange portion 303.

Figure 3:
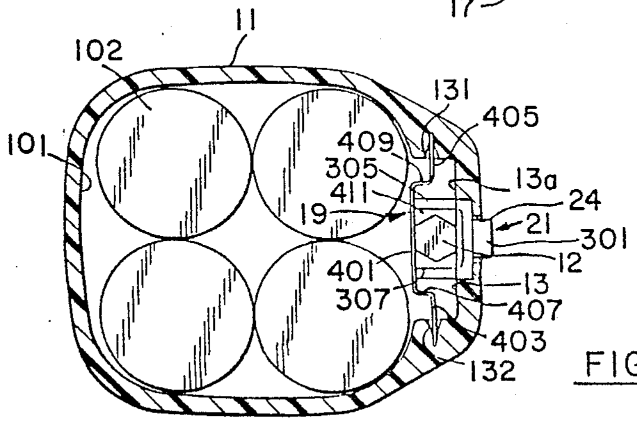
FIG. 3 is a cross-sectional view taken along line 3—3 of FIG. 1 and showing the first embodiment of the invention.

For the sake of clarity, no guide protrusions are shown in the view of FIG. 3. A wall of cavity 13 which is opposite to and facing leaf spring 19 across cavity 13 has two bearing portions 13_a_ and 13_b_ against which portions of the shank of the tool bit bear when in the retained position.

Head portion 301 of push-button element 21 protrudes slightly from a side surface 23 of handle 11 for easy access by the operator.

As seen from the embodiment of FIG.2 and FIG.3, the idle bit storage cavity is located near the base of handle 11 adjacent to a handle compartment 101 which in this example serves as a battery housing cavity for batteries such as 102 used with a cordless portable rotary power tool 100.

Hence from the foregoing, it is seen that the storage mechanism generally comprises an open-ended recess 13 extending longitudinally of the drill handle 11 for receiving a screw driving bit or other tool bit 12 (shown in FIG.3 but, for clarity, not shown in FIG.2). Access to recess 13 is through an opening 15 in a lower wall 17 of drill handle 11. The arrangement further includes a leaf spring 19 extending transversely of recess 13 and a push-button 21 mounted in a transversely extending cavity 24 opening in front wall 23 of the drill handle, with two wing or leg elements 305 and 307 of the push-button element in abutting engagement with central portion 401 of leaf spring 19. Push-button element 21 is slidable within housing cavity 24 to exert biasing force on spring 19 such that it moves away from the wall of cavity 13 including bearing surfaces 13_a_ and 13_b_. Therefore, in operation, a bit 12 is inserted into recess 13 by sliding bit 12 longitudinally into the recess through opening 15, thence through opening 411 such that the end-portions of bit 12 have a side abutting cavity wall portions 13_a_ and 13_b_. Bit 12 is then retained in recess 13 by resilient frictional engagement by spring 19 with one of the longitudinally extending straight sidewalls of bit 12 forcing the bit against bearing surfaces 13_a_ and 13_b_ of the wall of the housing cavity. In the illustrative embodiment shown, the tool bit is seen to have a conventional hexagonal cross section. In the storage position, it is to be noted that the bit 12 may lie entirely within the handle housing cavity with no part protruding therefrom. When it is desired to release the tool bit from its stored position, pressure is exerted on the head portion 301 of push-button element 21 thereby via legs 305 and 307 bowing section 401 of spring 19 in a direction away from bearing surfaces 13_a_ and 13_b_ thereby enabling the bit 12 to slide outwardly from recess 13 through opening 15.

Reference is now made to FIGS. 6 through 10_b_ illustrating the second and preferred embodiment. As shown best in FIGS. 10_a_ and 10_b_, the second embodiment primarily differs from the first embodiment by the provision of a holding means 501 in the first cavity 13 engaging the bit 12 and moveable between a first position (FIG. 10*a*) wherein all of the tool bit 12 is enclosed in the cavity 13 and a second position (FIG. 10*b*) wherein the tool bit 12 is partially exposed from the cavity 13 position. In the first embodiment when push-button element 21 is actuated the bit 12 may slide completely outwardly from recess 13 through opening 15 by the gravitational force acting on bit 12. In the second embodiment when button 21 is actuated, holding means 501 retains the tool bit 12 partially exposed from recess 13 through opening 15 where the bit may be grasped by a user for removal for use. The second embodiment also differs from the first embodiment by minor changes which have been made in the push-button 21 shown in FIGS. *7a–7e* and the retainer spring 515 shown in FIGS. *9a*, *9b*.

Holding means 501 includes a sleeve 503 for frictionally gripping bit 12 and a pin 507 extending laterally from sleeve 503 and slidably mounted in a slot 505 extending longitudinally of cavity 13. Sleeve 503 preferably has a "C" shaped cross section as shown in FIG. *8a*, is preferably made of a resilient plastic such as nylon, and is located in cavity 309 loosely between legs 305 and 307 of button 21.

Figure 4A:
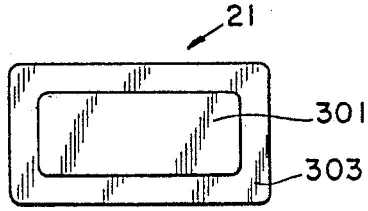
FIGS. 4*a*, 4*b* and 4*c* are front, side and top views respectively, of a push-button element suitable for use in practicing the first embodiment of the invention.
Figure 4B:
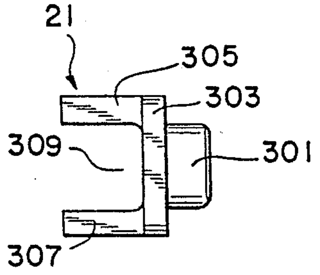
Figure 4C:
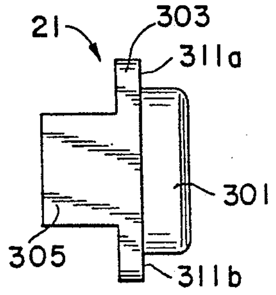
Figure 5A:
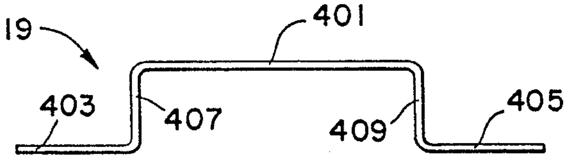
FIGS. 5*a* and 5*b* are top and front views, respectively, of a leaf spring suitable for use with the first embodiment of the invention.
Figure 5B:
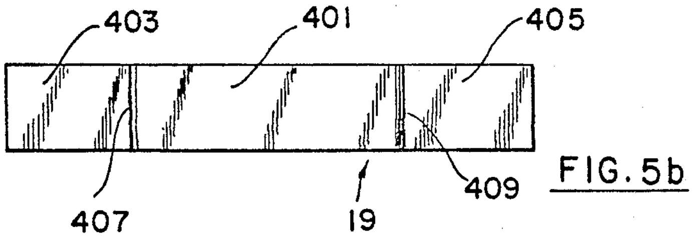
Figure 6:
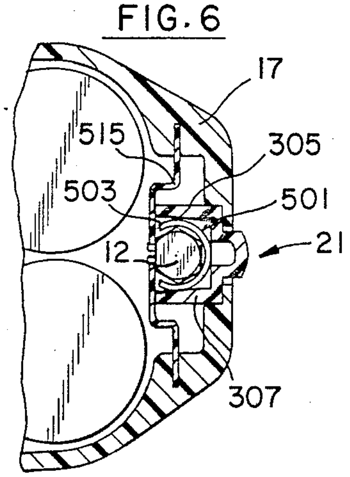
FIG. 6 is a cross-sectional view taken along lines 6—6 of FIG. 1 and showing a second embodiment of invention.
Figure 7A:
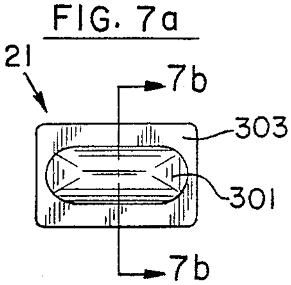
FIGS. 7*a*, 7*c*, 7*d* and 7*e* are front, top, back and side views, respectively, of a push-button element suitable for use in practicing the second embodiment of the invention.
Figure 7B:
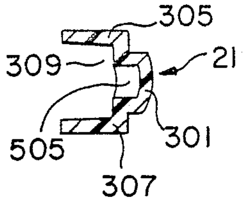
FIG. 7*b* is a cross-sectional view of FIG. 7*a* taken along line 7*b*—7*b*.
Figure 7C:
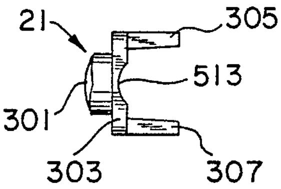
Figure 7D:
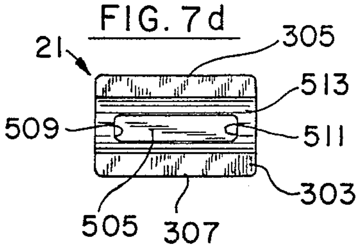
Figure 7E:
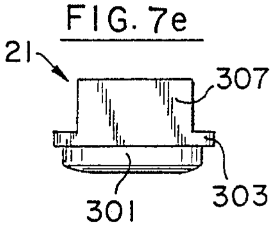
Figure 8A:
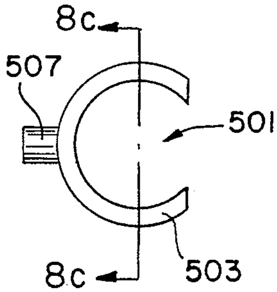
FIGS. 8_a_, and 8_b_ are top and side views respectively of a bit holder for use with the second embodiment of the invention.
Figure 8B:
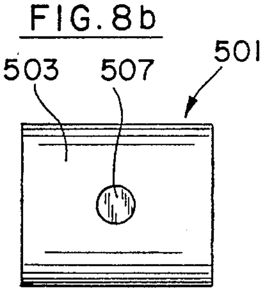
Figure 8C:
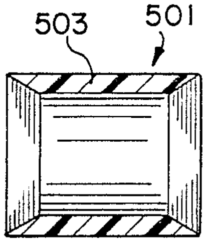
Figure 9C:
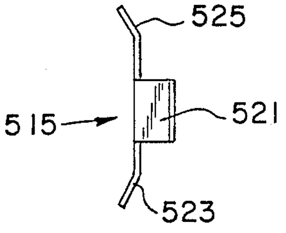
FIGS. 9_a_, 9_b_ and 9_c_ are top, front and side views, respectively, of a leaf spring suitable for use with the second embodiment of the invention.
Figure 9A:
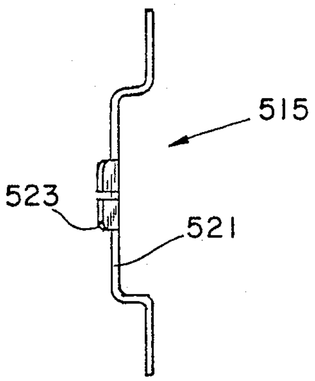
Figure 9B:
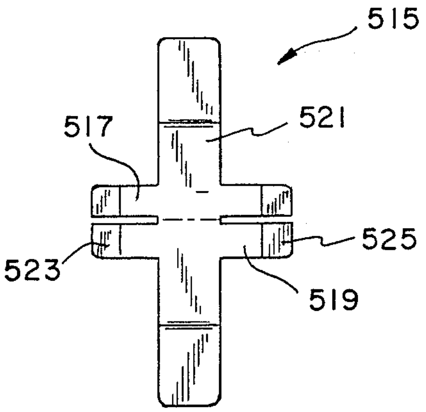
Figure 10A:
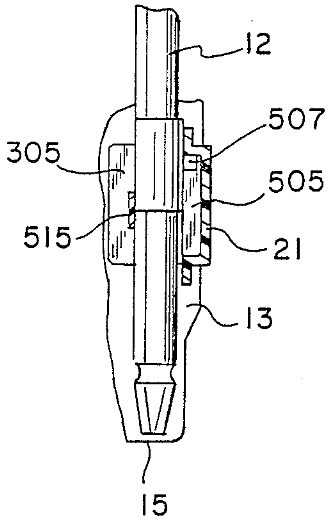
FIGS. 10_a_ and 10_b_ are fragmentary cross-sectional views of the drill of FIG. 1 illustrating the second embodiment of the invention.
Figure 10B:
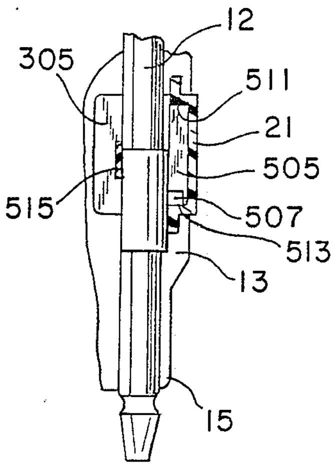

As shown in FIG. *7a–7e*, the preferred embodiment of button 21 differs from the first embodiment of button 21 shown in FIGS. 4*a*–4*c* by the provision in button head 301 of a slot 505 for receipt and guiding of pin 501 and a longitudinally extending concave inner wall 513 for guiding sleeve 503. Slot 505 has opposed end walls 509, 511 which limit the movement of pin 507 back and forth within slot 505. As shown in FIG. 10*a*, wall 509 defines the first position of the holding means 501 in which all of tool bit 12 is enclosed within cavity 13. As illustrated in FIG. 10*b*, wall 511 defines the second position of the holding means 501 in which tool bit 12 is partially exposed from the cavity 13. Concave wall 513 provides a complimentary guide surface for the outer periphery of sleeve 503. Movement of sleeve 503 is guided by engagement of the outer periphery of sleeve 503 with concave wall 513 and tangentially with the inner walls of legs 305,307.

As shown in FIGS. *9a–9c*, the preferred retainer spring 515 differs from the retainer spring shown in FIGS. *5a* and *5b* by the provision of a pair of tabs 517, 519 extending perpendicularly from wall portion 521. Tabs 517,519 provide a wall opposite to wall 513 to aid in alignment of the sleeve 501. Each tab 517,519 terminates in a flange 521,523 which is bent rearwardly from cavity 309 to avoid obstructing insertion and withdrawal of bit 12.

In operation, a bit 12 is inserted into recess 13 by sliding bit 12 longitudinally into the recess through opening 15 and into and through sleeve 503. As bit 12 engages sleeve 503, sleeve 503 is initially in the lower most position with pin 507 engaged with inner wall 511. With continued insertion of bit 12, sleeve 503 is moved upwardly until pin 507 engages wall 509. Thereafter, bit 12 continues to slide through sleeve 503 until bit 12 is fully enclosed within cavity 13. Bit 12 is then retained in recess 13 by frictional engagement caused by spring 515 forcing the bit 12 against bearing surfaces 13*a* and 13*b* in cavity 13.

To release bit 12 from its stored position, push-button 21 is pressed inwardly for moving retainer spring 515 from an engaged position for retaining the tool bit in cavity 13 to a disengaged position for releasing the bit for movement in cavity 13. When the retaining spring 515 is in the disengaged position, holding means 501 is free to move from the first position in which the bit 12 is enclosed within cavity 13 to the second position in which bit 12 is partially exposed from cavity 13. Push-button 21 moves the retainer spring 515 to the disengaged position by engagement of legs 305,307 with spring 515 resulting in the bowing of the central section of wall 521 in a direction away from bearing surfaces 13*a* and 13*b*. This enables sleeve 503 and bit 12 held therein to slide downwardly due to the force of gravity to the second position of sleeve 503 in which bit 12 is partially exposed from cavity 13 as shown in FIG. 10*b*. When the bit 12 is partially extended from recess 13, bit 12 may be manually pulled the remainder of the way from recess 13 for use.

The second embodiment has the advantage over the first embodiment that bit 12 is held by holding means 501 until the user is ready to grasp the bit for removal. In the first embodiment when button 21 is pushed to remove the bit, the user may drop the bit. Also if button 21 is inadvertently pushed, the bit may drop from recess 13 and be lost. These possibilities are mitigated by holding means 501 which holds bit 12 partially extended from recess 13 until the user can grasp bit 12.

The invention has been described with reference to a description of a preferred embodiment. The details of the description are for the sake of example only and are not intended to limit the scope and spirit of the invention, which is defined by the appended claims.

We claim:

1. Apparatus for storing a tool bit in an inoperative location in a housing comprising:

a first cavity in the housing opening at a peripheral surface thereof and shaped for sliding receipt of all of the tool bit;

a second cavity in the housing communicating with the first cavity and opening at a peripheral surface thereof, the second cavity extending substantially transversely of the first cavity;

retention means in the first cavity for engaging a longitudinally extending straight sidewall of the bit and resiliently urging the tool bit into frictional engagement with a wall of the first cavity thereby retaining the tool bit in the first cavity by frictional engagement of the retention means with the tool bit sidewall and the tool bit with the first cavity wall; and actuating means slidably received in the second cavity, having a head portion lying in the peripheral surface opening of the second cavity and a bearing portion coupled to the head portion, the bearing portion abutting the retention means in a manner such that upon pressure being exerted upon the head portion, the bearing portion will deflect the retention means away from the tool bit enabling the bit to slide outwardly from the first cavity and relative to the retention means and to the first cavity wall.

2. The apparatus of claim 1 wherein the retention means comprises a leaf spring having a substantially planar portion abuttingly engaging a first side of the tool bit at a side of the first cavity opposite to the wall of the cavity.

3. The apparatus of claim 2 wherein the head portion of the actuating means comprises a push-button protruding from the peripheral surface opening of the second cavity and wherein the bearing portion of the actuating means comprises first and second leg elements extending from and defining a three sided cavity with the push-button for surrounding the tool bit on sides of the tool bit not in contact with the leaf spring, the first and second leg elements having ends remote form the push-button for abutting the leaf spring, the first and second leg elements operative upon pressure being exerted upon the protruding push-button to deflect the leaf spring away from the first side of the tool bit.

4. The apparatus of claim 3 further comprising means for guiding sliding motion of the first and second leg elements in a direction substantially normal to the plane of the planar portion of the leaf spring.

5. Apparatus for releasably retaining a tool bit in an inoperative location in the housing of a rotary power tool comprising:

a first open ended recess extending through a portion of the housing and shaped for sliding receipt of all of the tool bit;

a second open ended recess extending through the housing substantially transverse to and in communication with the first recess;

a retaining leaf spring having a substantially planar portion positioned in the first recess and facing the opening of the second recess; and a push-button element slidably received in the second recess and having a head portion resting in the opening of the second recess and first and second legs extending from the head portion inwardly of the housing along the second recess, with ends of the first and second legs remote from the head portion extending into the first recess in abutting engagement with the planar portion of the leaf spring, the first and second legs spaced apart such that an opening therebetween is sufficient to enable sliding passage therethrough of the tool bit such that the planar portion of the leaf spring engages a longitudinally extending straight bit sidewall and resiliently urges the tool bit against a wall of the first cavity opposite the planar portion of the leaf spring thereby retaining the tool bit in the first cavity by frictional engagement of the leaf spring with the tool bit sidewall and the tool bit with the first cavity wall, the push-button element operative upon exertion of pressure on the head portion to deflect the spring planar portion away from the wall of the first cavity enabling the tool bit to slide outwardly from the first cavity and relative to the leaf spring and the first cavity wall.

6. The apparatus of claim 5 wherein the first and second recesses are located in a handle portion of the rotary power tool, with a longitudinal axis of the first recess parallel to a longitudinal axis of the handle portion.

7. The apparatus of claim 6 further comprising first and second notches in the first recess for respective retention of first and second ends of the retaining leaf spring.

8. The apparatus of claim 5 wherein the tool bit is a screw driving bit.

9. The apparatus of claim 5 further comprising means in the second recess for guiding sliding motion of the push-button element legs in a direction substantially normal to the planar portion of the retaining leaf spring.

10. A portable rotary power tool comprising:

a handle;

a storage cavity opening at a bottom surface of the handle and extending through the handle parallel to a longitudinal handle axis, the storage cavity shaped for sliding receipt of the tool bit such that no part of the tool bit need protrude from the handle in a stored position;

a mounting cavity opening at a side surface of the handle and extending through the handle transversely to and communicating with the storage cavity at an opening in a storage cavity wall;

a leaf spring, having first, second and third substantially planar interconnected surfaces, the leaf spring located in the storage cavity opposite the storage cavity wall, the second planar surface facing the storage cavity wall and the first and third planar surfaces extending substantially normally to the second planar surface such that the three planar surfaces partially surround a passage in the storage cavity for the tool bit with the second planar surface positioned to engage a longitudinally extending straight sidewall of the bit and resiliently urge the tool bit against the storage cavity wall thereby retaining the bit in the first cavity by frictional engagement of the leaf spring with the tool bit sidewall and the tool bit with the first cavity wall; and a push-button element slidably positioned in the mounting cavity with an actuating head stationed in the handle side surface opening and first and second legs coupled to the actuating head extending transversely across the storage cavity into abutting engagement with the second planar surface of the leaf spring, the first and second legs spaced apart so as to enable passage of the tool bit therebetween, the push-button element operative upon application of pressure on the actuating head from outside the handle to deflect the leaf spring away from the storage cavity wall enabling the bit to slide outwardly from the first cavity and relative to the leaf spring and storage cavity wall.

11. The apparatus of claim 10 further comprising a fourth substantially planar leaf spring surface connected to the first planar surface, a fifth substantially planar leaf spring surface connected to the third planar surface, the fourth and fifth surfaces extending substantially parallel to the second planar surface, and first and second notches in the handle opening toward the storage cavity and positioned for retaining receipt of respective ends of the fourth and fifth leaf spring surfaces.

12. The apparatus of claim 11 wherein the tool bit comprises a screw driving bit.

13. The apparatus of claim 12 wherein the screwdriving bit has a shank of hexagonal cross section and wherein the second surface of the leaf spring abuts one of the six sides of the shank, while a shank side opposite the spring abutting side engages the storage cavity wall in a retained position.

14. Apparatus for storing a tool bit in an inoperative location in a housing:

a first cavity in the housing opening at a peripheral surface thereof and shaped for sliding receipt of all of the tool bit;

a retainer in the cavity moveable between an engaged position for retaining the tool bit in the cavity and a disengaged position for releasing the tool bit for movement in the cavity;

a holder in the cavity engaging the bit and movable between a first engaged position wherein all of the tool bit is enclosed within the cavity and a second engaged position wherein the tool bit is partially exposed from the cavity; and an actuator slidably moveable in the housing for moving the retainer between the engaged and the disengaged position thereby enabling the holder to move from the first to the second position.

15. The apparatus of claim 14 wherein the holder comprises a sleeve for frictionally gripping the tool bit.

16. The apparatus of claim 15 wherein (a) the actuator includes a slot extending longitudinally of the cavity and (b) the holder includes a pin extending from the sleeve and slidably mounted in said slot.

17. The apparatus of claim 14 wherein said retainer resiliently urges the tool bit into frictional engagement with the wall of the cavity in the engaged and is deflected away cavity in the engaged position and is deflected away from the tool bit when in the disengaged position.

18. The apparatus of claim 14 wherein the actuator comprises a push-button protruding from an opening in the housing and first and second leg elements extending from and defining a three sided cavity with the push-button for surrounding the tool bit, the first and second leg elements having ends remote from the push-button for abutting the retainer, the first and second leg elements operative upon pressure exerted on the protruding push-button to deflect the retainer away from the tool bit and into the disengaged position.

19. A tool comprising:

a housing;

a tool bit stored in an inoperative location in the housing;

a cavity in the housing opening at a peripheral surface thereof and shaped for sliding receipt of all of the tool bit;

retention means in the cavity for resiliently urging the tool bit into frictional engagement with a wall of the cavity and retaining the bit in the cavity;

a holding means in the cavity engaging the bit and movable between a first position wherein all of the bit is enclosed within the cavity and second position wherein the bit is partially exposed from the cavity; and actuating means slidably movable in the housing transversely of the cavity for deflecting the retention means away from the tool bit when pressure is exerted on the actuating means thereby enabling the holding means to move from said first position to the second position.

20. The apparatus of claim 19 wherein the holding means comprises a sleeve for frictionally gripping the tool bit.

21. The apparatus of claim 20 wherein (a) the actuating means includes a slot extending longitudinally of the cavity and (b) the holding means includes a pin extending from the sleeve and slidably mounted in said slot.

* * * * *